US012725877B2

(12) United States Patent
Choi et al.

(10) Patent No.: US 12,725,877 B2
(45) Date of Patent: Sep. 1, 2026

(54) BATTERY MODULE AND BATTERY PACK INCLUDING THE SAME

(71) Applicant: LG ENERGY SOLUTION, LTD., Seoul (KR)

(72) Inventors: Yongjoon Choi, Daejeon (KR); Seungwon Han, Daejeon (KR); Youngho Lee, Daejeon (KR); Hyunjae Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 719 days.

(21) Appl. No.: 17/910,143

(22) PCT Filed: Nov. 24, 2021

(86) PCT No.: PCT/KR2021/017379
§ 371 (c)(1),
(2) Date: Sep. 8, 2022

(87) PCT Pub. No.: WO2022/114769
PCT Pub. Date: Jun. 2, 2022

(65) Prior Publication Data

US 2023/0097757 A1 Mar. 30, 2023

(30) Foreign Application Priority Data

Nov. 26, 2020 (KR) ........................ 10-2020-0161480
Nov. 22, 2021 (KR) ........................ 10-2021-0161637

(51) Int. Cl.
*H01M 50/30* (2021.01)
*H01M 50/211* (2021.01)
(Continued)

(52) U.S. Cl.
CPC ......... *H01M 50/30* (2021.01); *H01M 50/211* (2021.01); *H01M 50/271* (2021.01);
(Continued)

(58) Field of Classification Search
CPC .. H01M 50/30; H01M 50/296; H01M 50/211; H01M 50/21
See application file for complete search history.

(56) References Cited

U.S. PATENT DOCUMENTS 9,685,644 B2 6/2017 Lampe-Onnerud et al.
9,871,236 B2 1/2018 Lampe-Onnerud et al.
(Continued)

FOREIGN PATENT DOCUMENTS

CN 102456857 A 5/2012
CN 110574189 A 12/2019
(Continued)

OTHER PUBLICATIONS

European Search Report for European Application No. 21898595.0, dated Jun. 11, 2024.

(Continued)

*Primary Examiner* — Kenneth J Douyette
(74) *Attorney, Agent, or Firm* — Birch, Stewart, Kolasch & Birch, LLP

(57) ABSTRACT

A battery module includes a battery cell stack in which a plurality of battery cells are stacked, a module frame that houses the battery cell stack, a first busbar frame that is housed in the module frame and covers the front surface of the battery cell stack, and a second busbar frame that is housed in the module frame and covers the rear surface of the battery cell stack, wherein a terminal busbar is mounted to the first busbar frame, and a module connector is mounted to the second busbar frame, and wherein the module frame is formed with a venting part penetrating the upper plate, and the venting part is located closer to the module connector than the terminal busbar.

10 Claims, 8 Drawing Sheets

(51) Int. Cl.
*H01M 50/271* (2021.01)
*H01M 50/296* (2021.01)
*H01M 50/507* (2021.01)

(52) U.S. Cl.
CPC ....... *H01M 50/296* (2021.01); *H01M 50/507* (2021.01); *H01M 2200/20* (2013.01)

(56) References Cited

U.S. PATENT DOCUMENTS

| | | | |
|---|---|---|---|
| 10,446,813 | B2 | 10/2019 | Kim et al. |
| 10,629,876 | B2 | 4/2020 | Lampe-Onnerud et al. |
| 10,637,022 | B2 | 4/2020 | Lampe-Onnerud et al. |
| 10,790,489 | B2 | 9/2020 | Lampe-Onnerud et al. |
| 2009/0047574 | A1* | 2/2009 | Hellmann ........... H01M 50/503 429/121 |
| 2010/0314950 | A1 | 12/2010 | Rutkowski et al. |
| 2011/0293973 | A1 | 12/2011 | Kim |
| 2012/0015218 | A1 | 1/2012 | Lee |
| 2012/0094155 | A1 | 4/2012 | Lim |
| 2012/0164490 | A1 | 6/2012 | Itoi et al. |
| 2013/0252037 | A1 | 9/2013 | Chiba |
| 2016/0020447 | A1* | 1/2016 | Janarthanam ....... H01M 10/625 180/68.5 |
| 2016/0126531 | A1 | 5/2016 | Kim et al. |
| 2016/0149192 | A1 | 5/2016 | Motokawa |
| 2016/0233465 | A1 | 8/2016 | Lee et al. |
| 2017/0033419 | A1 | 2/2017 | Eom et al. |
| 2018/0159096 | A1 | 6/2018 | Kim et al. |
| 2018/0375076 | A1 | 12/2018 | Lampe-Onnerud et al. |
| 2019/0097192 | A1* | 3/2019 | Kim .................... H01M 50/394 |
| 2019/0198952 | A1 | 6/2019 | Choi et al. |
| 2019/0237718 | A1 | 8/2019 | Ohshiba et al. |
| 2020/0076025 | A1 | 3/2020 | Jo et al. |
| 2020/0136118 | A1 | 4/2020 | Weinberger et al. |
| 2020/0227708 | A1 | 7/2020 | Ahn et al. |
| 2021/0226295 | A1 | 7/2021 | Kwon et al. |

FOREIGN PATENT DOCUMENTS

| | | | |
|---|---|---|---|
| CN | 111106297 | A | 5/2020 |
| CN | 111279516 | A | 6/2020 |
| JP | 2010-205509 | A | 9/2010 |
| JP | 2011-249309 | A | 12/2011 |
| JP | 2013-197019 | A | 9/2013 |
| JP | 2015-195128 | A | 11/2015 |
| JP | 2017-526102 | A | 9/2017 |
| JP | 2018-530107 | A | 10/2018 |
| JP | 2019-160394 | A | 9/2019 |
| JP | 2020-520067 | A | 7/2020 |
| KR | 10-2009-0010393 | A | 1/2009 |
| KR | 10-2010-0081942 | A | 7/2010 |
| KR | 10-2012-0009592 | A | 2/2012 |
| KR | 10-2012-0049224 | A | 5/2012 |
| KR | 10-2014-0146707 | A | 12/2014 |
| KR | 10-2015-0109726 | A | 10/2015 |
| KR | 10-2015-0118375 | A | 10/2015 |
| KR | 10-2018-0113802 | A | 10/2018 |
| KR | 10-2019-0078521 | A | 7/2019 |
| KR | 10-2020-0013116 | A | 2/2020 |
| KR | 10-2020-0084450 | A | 7/2020 |
| WO | WO 2017/003168 | A1 | 1/2017 |
| WO | WO 2020/110095 | A1 | 6/2020 |

OTHER PUBLICATIONS

International Search Report (PCT/ISA/210) issued in PCT/KR2021/017379, dated Mar. 2, 2022.

* cited by examiner

【FIG. 1】
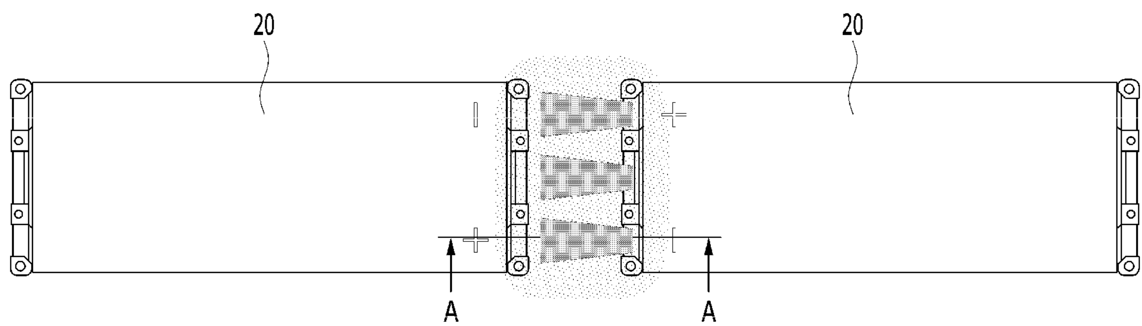
Conventional Art
【FIG. 2】
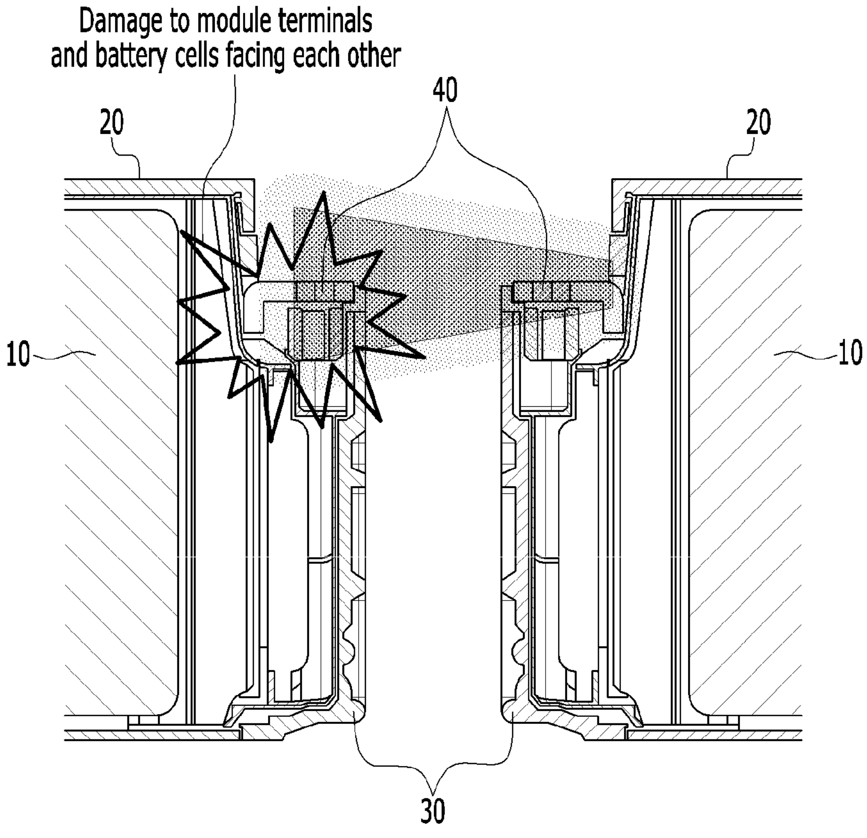

【FIG. 3】
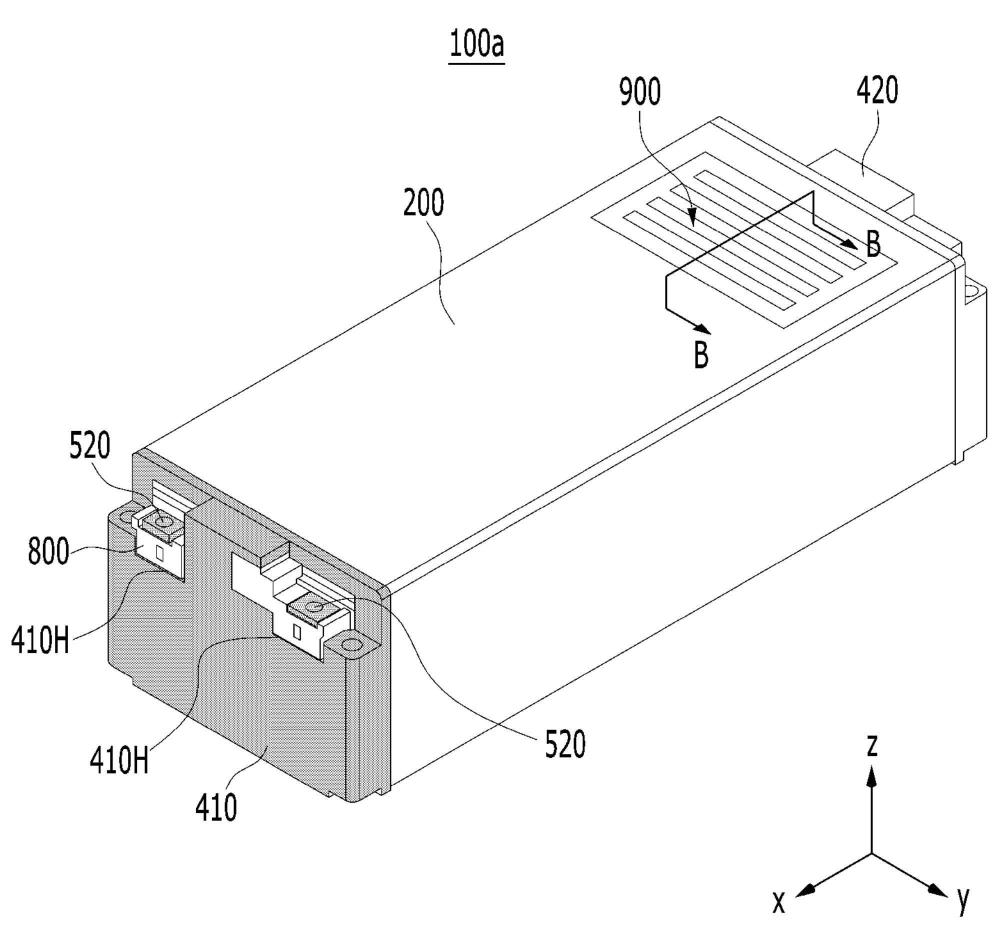

【FIG. 4】
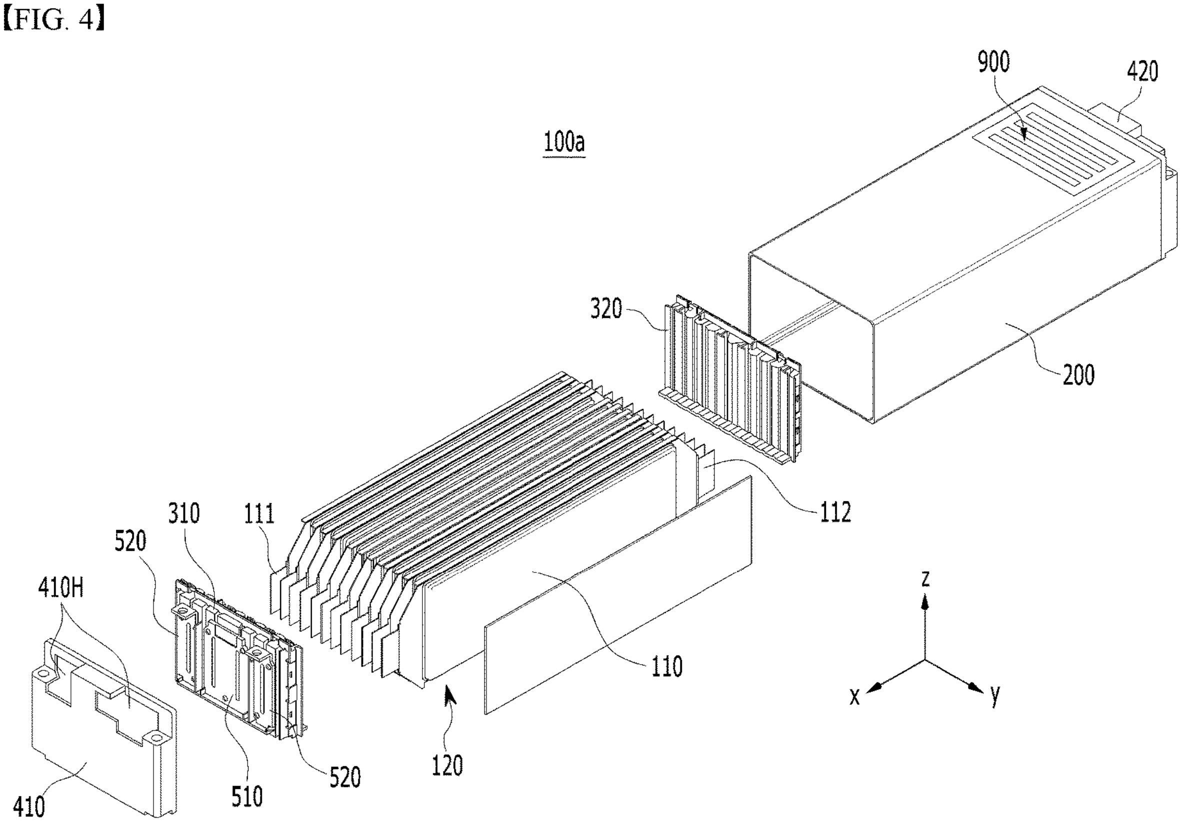

【FIG. 5】
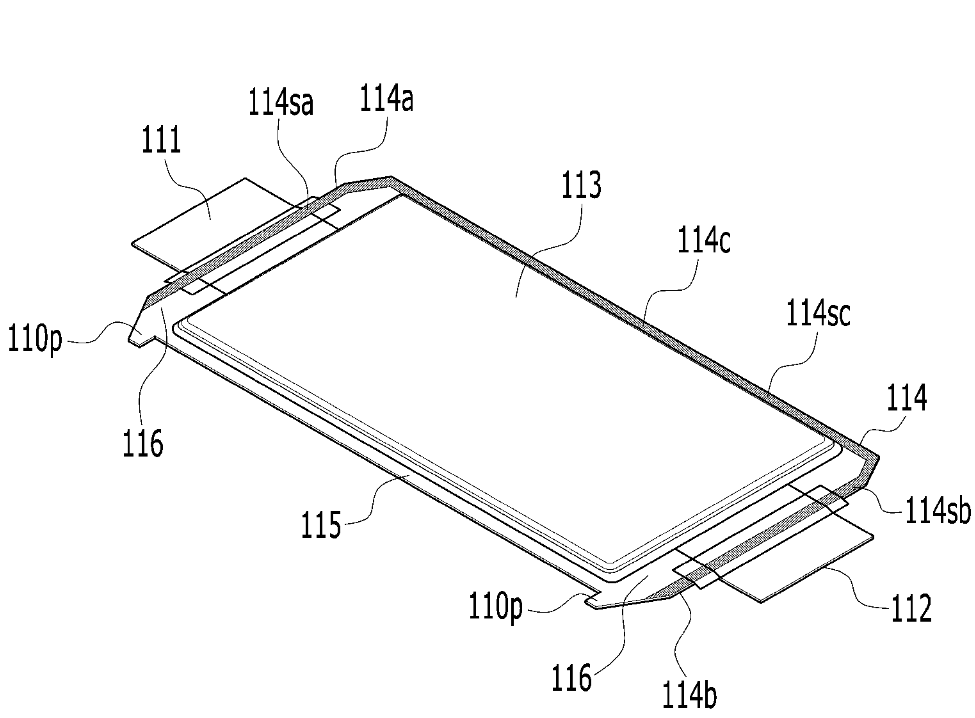

【FIG. 6】
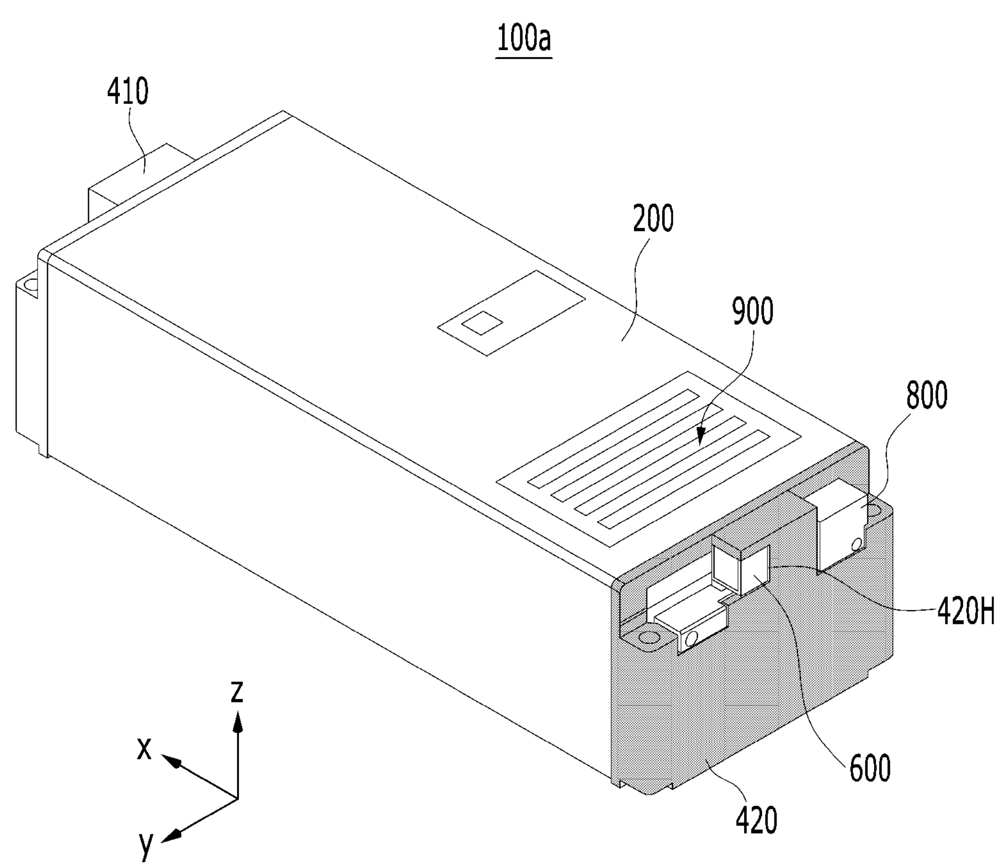

【FIG. 7】
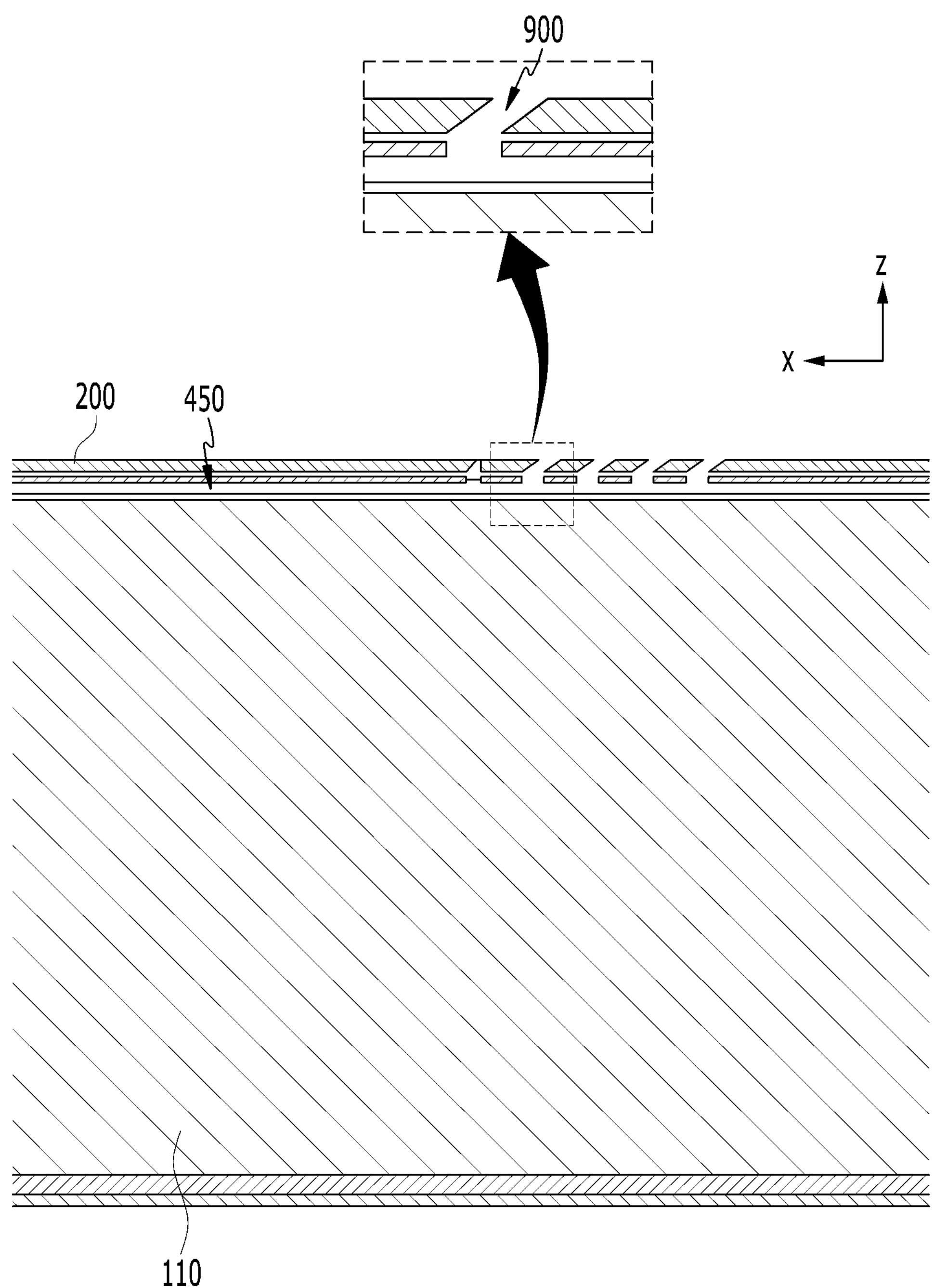

【FIG. 8】
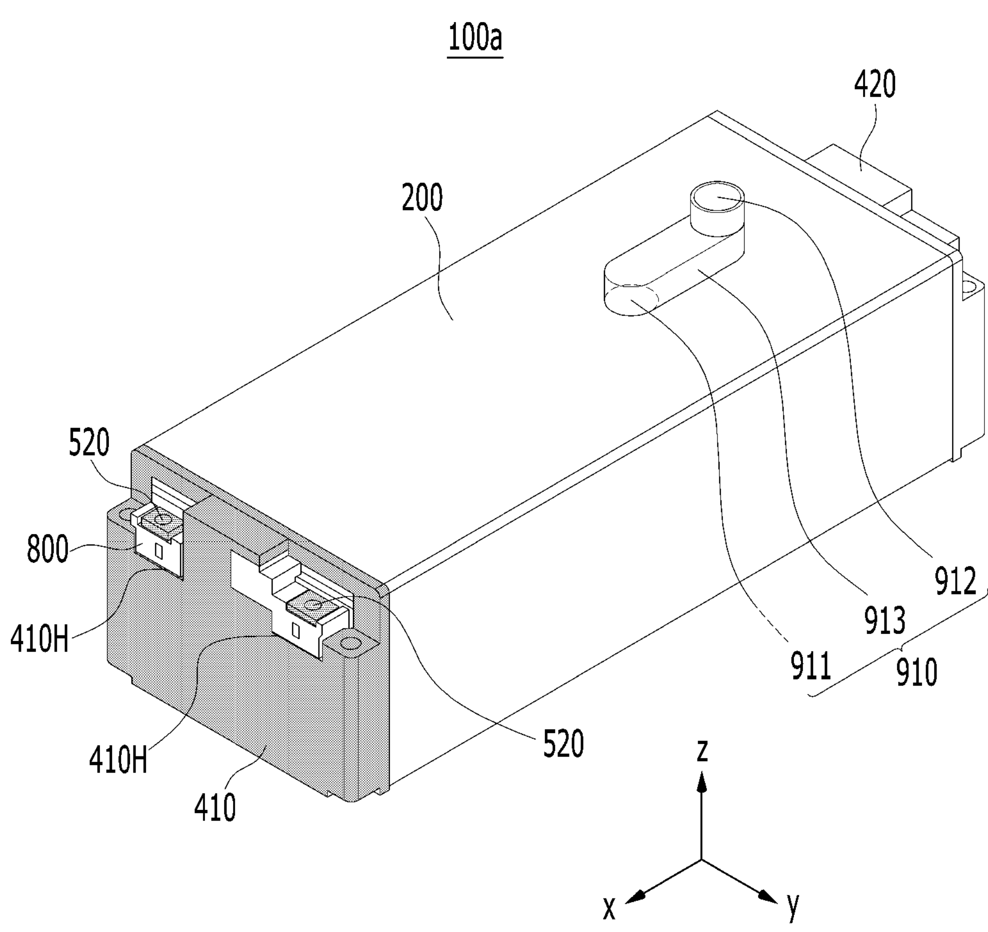

【FIG. 9】
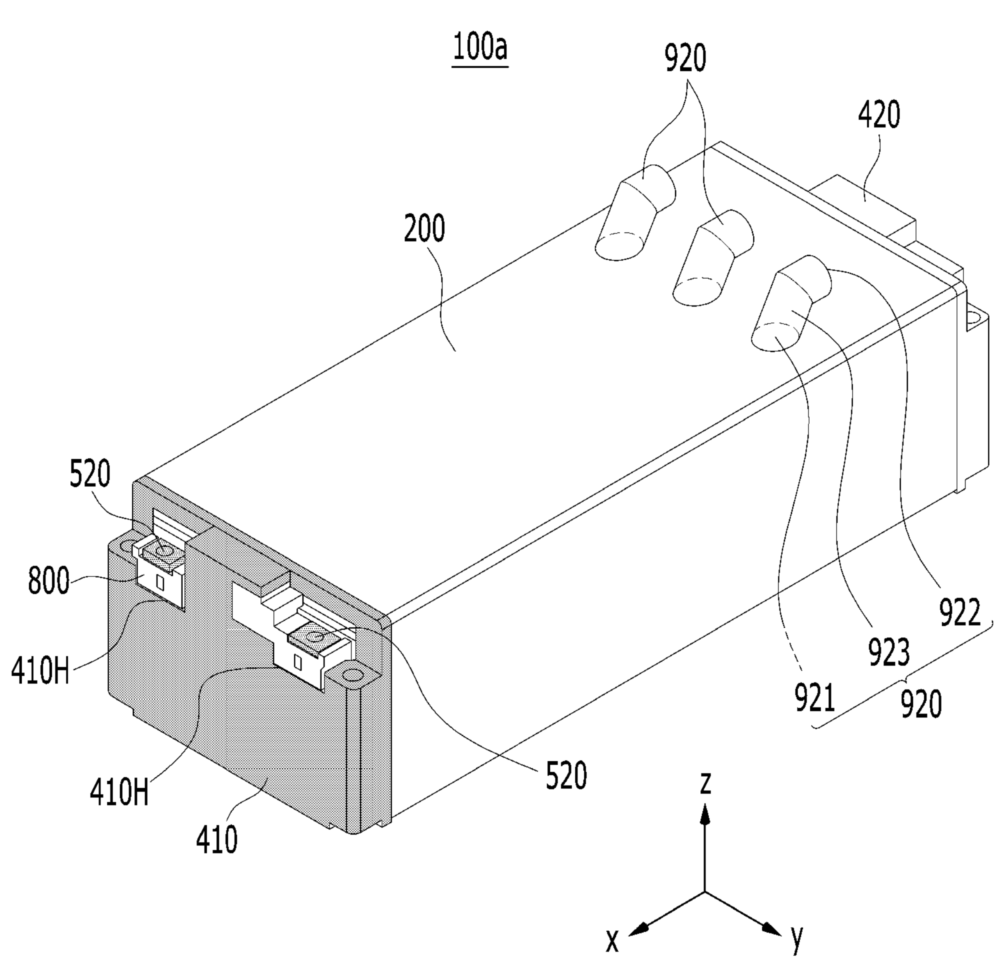

BATTERY MODULE AND BATTERY PACK INCLUDING THE SAME

TECHNICAL FIELD

Cross Citation with Related Application(s)

This application claims the benefit of Korean Patent Application No. 10-2020-0161480 filed on Nov. 26, 2020 and Korean Patent Application No. 10-2021-0161637 filed on Nov. 22, 2021 with the Korean Intellectual Property Office, the disclosures of which are incorporated herein by reference in their entirety.

The present disclosure relates to a battery module and a battery pack including the same, and more particularly, to a battery module having an enhanced safety, and a battery pack including the same.

BACKGROUND ART

With the increase of the technological development and demand for a mobile device, demand for a secondary battery as an energy source is rapidly increasing, and accordingly, many researches of the battery capable of meeting a variety of needs are emerging.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common. Since the battery cells constituting these middle or large-sized battery modules are composed of chargeable/dischargeable secondary batteries, such a high-output and large-capacity secondary battery generates a large amount of heat in a charging and discharging process.

The battery module may include a battery cell stack in which a plurality of battery cells are stacked, a frame for housing the battery cell stack, and end plates for covering the front and rear surfaces of the battery cell stack.

FIG. 1 is a view showing the appearance of a battery module mounted on a conventional battery pack at the time of ignition. FIG. 2 is a section taken the line A-A of FIG. 1, which is a cross-sectional view showing the appearance of a flame that affects adjacent battery modules during ignition of a battery module mounted on a conventional battery pack.

Referring to FIGS. 1 and 2, the conventional battery module includes a battery cell stack in which a plurality of battery cells 10 are stacked, a frame 20 for housing the battery cell stack, end plates 30 formed on the front and rear surfaces of the battery cell stack, terminal busbars 40 formed so as to protrude to the outside of the end plates 30, and the like.

The frame 20 and the end plate 30 can be combined so as to be sealed by welding. When the frame 20 for housing the battery cell stack and the end plate 30 are combined in this way, the internal pressure of the battery cells 10 increases during overcharge of the battery module to exceed a limit value of the fusion strength of the battery cell. In this case, high-temperature heat, gas, and flame generated in the battery cells 10 can be discharged to the outside of the battery cell 10.

At this time, the high-temperature heat, gas and flame may be discharged through the openings formed in the end plates 30. However, in a battery pack structure in which a plurality of battery modules are arranged so that the end plates 30 face each other, the high-temperature heat, gas and flame ejected from the battery module may affect a battery module. Thereby, the terminal busbar 40 formed on the adjacent end plates 30 of the battery module may be damaged, and high-temperature heat, gas, and flame may enter the inside of the battery module via the openings formed in the adjacent end plates 30 of the battery module to damage the plurality of battery cells 10.

DETAILED DESCRIPTION OF THE INVENTION

Technical Problem

It is an object of the present disclosure to provide a battery module capable of dispersing high-temperature heat and flame discharged when an ignition phenomenon occurs inside the battery module, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked, a module frame that houses the battery cell stack, the module frame having an upper plate, a first busbar frame that is housed in the module frame and covers a front surface of the battery cell stack, and a second busbar frame that is housed in the module frame and covers a rear surface of the battery cell stack, wherein a terminal busbar is mounted to the first busbar frame, and a module connector is mounted to the second busbar frame, and wherein the module frame is formed with a vent penetrating the upper plate, and the vent is located closer to the module connector than the terminal busbar.

The vent has a hole structure formed in the upper plate, and the hole structure may penetrate the upper plate obliquely so that an upper end is closer to the second busbar frame.

The terminal busbar may be connected to an external busbar that provides a connection with another battery module.

The vent may be formed so as to vent a gas in a direction toward the second busbar frame is located.

The vent comprises an inflow port that is formed in the upper plate of the module frame and faces the battery cell stack, and a discharge port that discharges gas flowed in through the inflow port, wherein the discharge port may be formed in a direction perpendicular to the inflow port.

The vent comprises a connection part that is formed between the inflow port and the discharge port and guides gas flowing into the inflow port toward the discharge port, and an upper surface of the connection part may be formed obliquely to the upper plate.

The vent may be formed so as to be vented in an upward direction with respect to the battery cell stack.

The vent comprises an inflow port that is connected to the battery cell stack and is formed in the upward direction on the upper plate of the module frame, a discharge port that is formed in the upward direction and discharges the gas flown in through the inflow port, and a connection part that connects the inflow port and the discharge port, wherein the connection part may be formed in a direction perpendicular to inflow and discharge directions of the inflow port and the discharge port.

A discharge passage may be formed between the upper plate of the module frame and the battery cell stack.

According to another embodiment of the present disclosure, there is provided a battery pack comprising the above-mentioned battery module.

Advantageous Effects

According to embodiments of the present disclosure, in order to control high temperature heat, gas and flame when thermal runaway phenomenon occurs in the battery module, a venting part can be formed at the upper end of the battery module so that it is adjacent to the module connector disposed on the other side of the battery module rather than the terminal busbar disposed on one side of the battery module, thereby delaying the propagation of flames to the adjacent battery module.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a view showing the appearance of a battery module mounted on a conventional battery pack at the time of ignition;

FIG. 2 is a section taken the line A-A of FIG. 1, which is a cross-sectional view showing the appearance of a flame that affects adjacent battery modules during ignition of a battery module mounted on a conventional battery pack.

FIG. 3 is a perspective view showing a battery module according to one embodiment of the present disclosure;

FIG. 4 is an exploded perspective view of the battery module of FIG. 3;

FIG. 5 is a perspective view of a battery cell included in the battery module of FIG. 4;

FIG. 6 is a perspective view showing the second end plate of the battery module of FIG. 3 by changing a viewing angle so that it can be seen from the front;

FIG. 7 is a cross-sectional view taken along the cutting line B-B of FIG. 3;

FIG. 8 is a perspective view showing a battery module according to another embodiment of the present disclosure; and FIG. 9 is a perspective view showing a battery module according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure can be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 3 is a perspective view showing a battery module according to one embodiment of the present disclosure. FIG. 4 is an exploded perspective view of the battery module of FIG. 3. FIG. 5 is a perspective view of a battery cell included in the battery module of FIG. 4.

Referring to FIGS. 3 to 5, a battery module **100*a* according to one embodiment of the present invention includes a battery cell stack 120 in which a plurality of battery cells 110 including electrode leads 111 and 112 protruding in the mutually opposing directions are stacked, a module frame 200 for housing the battery cell stack 120, a first busbar frame 310 disposed on one surface of the battery cell stack 120 in one direction (x-axis direction) in which the electrode leads 111 protrude, and a second busbar frame 320 disposed on the other surface of the battery cell stack 120 in the other direction (−x-axis direction) in which the electrode lead 112** protrudes.

First, referring to FIG. 5, the battery cell 110 is preferably a pouch-type battery cell. For example, the battery cell 110 according to the present embodiment has a structure in which two electrode leads 111 and 112 face each other and protrude from one end **114*a* and the other end 114*b* of the cell main body 113, respectively. More specifically, the electrode leads 111 and 112 are connected to an electrode assembly (not shown), and protrude from the electrode assembly (not shown) to the outside of the battery cell 110**.

On the other hand, the battery cell 110 can be manufactured by joining both end parts **114*a* and 114*b* of the cell case 114 and one side part 114*c* connecting them, in a state in which the electrode assembly (not shown) is housed in a cell case 114. In other words, the battery cell 110 according to the present embodiment has a total of three sealing parts 114*sa*, 114*sb* and 114*sc*, the sealing parts 114*sa*, 114*sb*** and

114*sc* have a structure sealed by a method such as heat fusion, and the remaining other side part may be formed of a connection part 115. The cell case 114 may be formed of a laminated sheet containing a resin layer and a metal layer.

In addition, the connection part 115 may extend long along one edge of the battery cell 110, and a protrusion part 110*p* of the battery cell 110 called a bat-ear may be formed at an end part of the connection part 115. Further, while the cell case 114 is sealed with the protruding electrode leads 111 and 112 being interposed therebetween, a terrace part 116 may be formed between the electrode leads 111 and 112 and the cell main body 113. That is, the battery cell 110 includes a terrace part 116 formed to extend from the cell case 114 in a protruding direction of the electrode leads 111 and 112.

The battery cell 110 may be configured by a plurality of numbers, and the plurality of battery cells 110 may be stacked so as to be electrically connected to each other, thereby forming a battery cell stack 120. Referring to FIG. 4, the battery cells 110 can be stacked along the y-axis direction to form a battery cell stack 120. A first busbar frame 310 may be located on one surface of the battery cell stack 120 in the protruding direction of the electrode leads 111 (x-axis direction). A second busbar frame 320 may be located on the other surface of the battery cell stack 120 in the protruding direction of the electrode leads 112 (−x-axis direction). The battery cell stack 120, the first busbar frame 310, or the second busbar frame 320 may be housed in the module frame 200. The module frame 200 can protect the battery cell stack 120 housed inside the module frame 200 and the electrical components connected thereto from external physical impacts.

The module frame 200 according to embodiments of the present disclosure may have a mono frame structure. First, the mono frame may be in the form of a metal plate material in which the upper surface, the lower surface and both side surfaces are integrated, and may be manufactured by extrusion molding. However, the structure of the module frame 200 is not limited thereto, and may be a structure in which a U-shaped frame and an upper plate are combined. In the case of a structure in which a U-shaped frame and an upper plate are combined, it can be formed by combining the upper plate to the upper side of a U-shaped frame, which is a metal plate material having a lower surface and both sides combined or integrated, and it may be manufactured by press molding.

A thermal conductive resin can be injected between the battery cell stack 120 and the lower surface of the module frame 200, and a thermal conductive resin layer (not shown) may be formed between the battery cell stack 120 and the lower surface of the module frame 200 through the injected thermal conductive resin.

On the other hand, the module frame 200 can be opened in the protruding direction of the electrode leads 111 and 112 (x-axis direction, −x-axis direction), and a first end plate 410 and a second end plate 420 may be located on both open sides of the module frame 200, respectively. The first end plate 410 can be joined to the module frame 200 while covering the first busbar frame 310, and the second end plate 420 can be joined to the module frame 200 while covering the second busbar frame 320. That is, a first busbar frame 310 may be located between the first end plate 410 and the battery cell stack 120, and a second busbar frame 320 may be located between the second end plate 420 and the battery cell stack 120. Further, an insulating cover 800 (see FIG. 3) for electrical insulation may be located between the first end plate 410 and the first busbar frame 310.

The first end plate 410 and the second end plate 420 are located so as to cover the one surface and the other surface of the battery cell stack 120, respectively. The first end plate 410 and the second end plate 420 can protect the first busbar frame 310, the second busbar frame 320 and various electrical components connected thereto from external impacts. For this purpose, it must have a predetermined strength and may include a metal such as aluminum. Further, the first end plate 410 and the second end plate 420 may be joined to a corresponding edge of the module frame 200 by a method such as welding, respectively.

The first busbar frame 310 is located on one surface of the battery cell stack 120 to cover the battery cell stack 120 and at the same time, guide the connection between the battery cell stack 120 and an external device. Specifically, at least one of the busbar, the terminal busbar and the module connector may be mounted on the first busbar frame 310. In particular, at least one of the busbar, the terminal busbar and the module connector may be mounted on a surface opposite to the surface where the first busbar frame 310 faces the battery cell stack 120. In one example, FIG. 4 shows a state in which the busbar 510 and the terminal busbar 520 are mounted on the first busbar frame 310.

The battery cells 110 constituting the battery cell stack 120 may be connected in series or in parallel by the busbar 510 or the terminal busbar 520, and the battery cells 110 can be electrically connected to an external device or circuit through the terminal busbar 520 exposed to the outside of the battery module 100*a*. In one example, the terminal busbar 520 may be connected to an external busbar that provides a connection with other battery modules adjacent to the battery module including the terminal busbar 520.

The first busbar frame 310 may include an electrically insulating material. The first busbar frame 310 restricts the busbar 510 or the terminal busbar 520 from making contact with the battery cells 110, except for the portion where the busbar 510 or the terminal busbar 520 is joined to the electrode leads 111, thereby preventing the occurrence of a short circuit.

On the other hand, as described above, the second busbar frame 320 may be located on the other surface of the battery cell stack 120. A busbar and a module connector may be mounted on the second busbar frame 320. The electrode lead 112 may be joined to the busbar mounted on the second busbar frame 320. The second busbar frame 320 may include an electrically insulating material to prevent a short circuit.

An opening in which the terminal busbar 520 is exposed can be formed in the first end plate 410 according to the present embodiment. The opening may be a terminal busbar opening. In one example, as shown in FIGS. 3 and 4, a terminal busbar opening 410H to which the terminal busbar 520 is exposed can be formed in the first end plate 410. The terminal busbar 520 further includes an upwardly protruding portion as compared with the busbar 510. Such upwardly protruding portion is exposed to the outside of the battery module 100*a* through the terminal busbar opening 410H. The terminal busbar 520 exposed via the terminal busbar opening 410H may be connected to another battery module or a battery disconnect unit (BDU) to form a high voltage (HV) connection.

FIG. 6 is a perspective view showing the second end plate of the battery module of FIG. 3 by changing a viewing angle so that it can be seen from the front. FIG. 7 is a cross-sectional view taken along the cutting line B-B of FIG. 3.

Referring to FIG. 6, an opening through which at least one of the module connectors is exposed may be formed in the second end plate 420 according to the present embodiment. The opening may be a module connector opening. In one example, as shown in FIG. 6, a module connector opening 420H through which the module connector 600 is exposed may be formed in the second end plate 420. This means that the module connector 600 is mounted on the above-mentioned second busbar frame 320.

Meanwhile, although not specifically illustrated in the figure, the module connector 600 may be connected to a temperature sensor, a voltage measuring member, or the like provided inside the battery module 100*a*. This module connector 600 is connected to an external BMS (Battery Management System) to form an LV (Low voltage) connection. The temperature sensor or the voltage measuring member perform the function of transmitting temperature information, voltage level and the like measured by the temperature sensor or the voltage measuring member to the external BMS.

Referring to FIGS. 3, 6 and 7, a venting part 900 is formed on the upper plate of the module frame 200, wherein the venting part 900 may be formed adjacent to the module connector 600 rather than the terminal busbar 520. The venting part 900 has a hole structure formed in the upper plate of the module frame 200. The hole structure may penetrate the upper plate of the module frame 200 obliquely in a direction close to the second busbar frame 320. The venting part 900 may be formed so as to vent gas in a direction in which the second busbar frame 320 or the second end plate 420 is located. When heat, gas, flame or spark is generated inside the battery module 100*a*, this is for discharging the heat, gas, flames or spark in a direction toward the second busbar frame 320 or the second end plate 420 in which a member (hereinafter referred to as an LV member) forming an LV connection such as the module connector 600 is located, rather than in the direction toward the first busbar frame 310 or the first end plate 410 in which a member (hereinafter referred to as an HV member) forming an HV connection such as the terminal busbar 520 is located.

According to the present embodiment, as shown in FIG. 7, a discharge passage 450 may be formed between the upper part of the module frame 200 and the battery cell stack 120. Gas or heat generated between the first end plate 410 and the battery cell stack 120 is disposed on the second busbar frame 320 or the second end plate 420 located on the opposite side of the first end plate 410 through the discharge passage 450. Gas or heat moved toward the second busbar frame 320 or the second end plate 420 may be discharged from the battery module 100*a* through the venting part 900. The HV member is more prone to overheating than the LV member and is more susceptible to self-ignition or internal ignition. Thus, if the gas or heat generated around the first end plate 410 through the discharge passage 450 is induced in the direction in which the second end plate 420 is located, an internal heat propagation phenomenon may be alleviated.

Referring to FIGS. 1 and 2, in the case of a conventional battery module, high-temperature heat, gas, flame and the like ejected through an opening of the battery module may affect adjacent battery modules. In particular, adjacent battery modules facing each other for HV connection may cause damage to other electrical components including the terminal busbar 40 or the battery cell 10.

Unlike the conventional case, in the battery module 100*a* according to the present embodiment, the venting part 900 is formed on the upper plate of the module frame 200, and the venting part 900 is formed adjacent to the module connector 600 rather than the terminal busbar 520, thereby capable of restricting the discharge of high-temperature heat, gas, flame and the like resulting from the battery cell 110 through the opening of the first end plate 410, for example, the terminal busbar opening 410H. When the flame is transferred to the terminal busbar 520, the external busbars connecting the adjacent battery modules may be melted and further ignited due to an internal short circuit, which is highly likely to be transferred to the adjacent battery modules. However, according to the present embodiment, damage to adjacent battery modules and HV connection structures can be greatly reduced.

FIG. 8 is a perspective view showing a battery module according to another embodiment of the present disclosure.

Referring to FIG. 8, the venting part 910 according to the present embodiment may be formed so as to be vented in the upward direction with respect to the battery cell stack 120. The venting part 910 may include an inflow port 911 that is connected to the battery cell stack 120 and is formed in an upward direction on the upper surface of the module frame 200, a discharge port 912 that is formed in the upward direction and discharges gas flown in through the inflow port 911, and a connection part 913 that connects the inflow port 911 and the discharge port 912. The connection part 913 may be formed in a direction perpendicular to the inflow and discharge directions of the inflow port 911 and the discharge port 912.

The venting unit 910 can discharge high-temperature heat, gas, and flame inside the battery module toward the upward direction of the battery module, thereby minimizing damage to other battery modules arranged by abutting the end plate. However, since the discharge port 912 is formed toward the upward direction, foreign materials in the air can enter the discharge port 912 due to gravity. Thus, the connection part 913 can be formed in a direction perpendicular to the discharge port 912, thereby minimizing a phenomenon in which foreign materials flown into the discharge port 912 are flown into the battery module through the inflow port 911.

Further, a foreign material blocking part (not shown) for blocking foreign substances entering through the discharge port 912 is formed on the connection part 913, thereby preventing foreign materials from entering into the portion of the inflow port 911 via the connection part 913 from the portion of the discharge port 912.

FIG. 9 is a perspective view showing a battery module according to another embodiment of the present disclosure.

Referring to FIG. 9, the venting unit 920 according to the present embodiment includes an inflow port 921 that is formed on the upper surface of the module frame 200 to connect to the battery cell stack, and a discharge port 922 that discharges gas flown through the inflow port 921, wherein the discharge port 922 may be formed in a direction perpendicular to the inflow port 921. In addition, the venting part 920 includes a connection part 923 that is formed between the inflow port 921 and the discharge port 922 and guides gas flowing into the inflow port 921 in a direction in which the discharge port 922 is located, and the upper surface of the connection part 923 may be formed obliquely.

The discharge port 922 is formed in a direction perpendicular to the upper surface of the inflow port 921 and the module frame 200, thereby capable of preventing the phenomenon that foreign materials floating in the air from enter the discharge port 922 due to gravity. In addition, the upper surface of the connection part 923 is formed obliquely toward the discharge port 922, and high-temperature heat, gas, and flame flown into the inflow port 921 switch directions through the connection part 923 and are naturally discharged through the discharge port 922.

Next, the experimental results for confirming the effects of the venting part 900 of the present embodiment will be described.

Table 1 compares the time required for voltage drop depending on the presence/absence and position of the venting unit 900 at the time of ignition inside the battery module.

TABLE 1

| Category Type | REFERENCE Closed structure (No venting part) | | CASE 1 Concentrated venting structure around LV member | | CASE 2 Overall venting structure | |
|---|---|---|---|---|---|---|
| Top-plate hole | — | | 6 ea | | 10 ea | |
| First Venting & Flame | 156 sec | | 88 sec | | 74 sec | |
| dT/dt ≥ 1° C./sec | n/a | | 86 sec | | 82 sec | |
| Measure temp. > 60° C. | n/a | | 95 sec | | 83 sec | |
| Voltage drop start | 186 sec | +0 | 125 sec | +37 | 102 sec | +7 |
| Bank02 Voltage drop start | 186 sec | +13 | 162 sec | +38 | 109 sec | +1 |
| Bank03 Voltage drop start | 199 sec | +19 | 200 sec | +21 | 110 sec | +2 |
| Bank04 Voltage drop start | 218 sec | +41 | 221 sec | +49 | 112 sec | +11 |
| Bank05 Voltage drop start | 259 sec | +24 | 270 sec | +55 | 123 sec | +45 |
| Bank06 Voltage drop start | 283 sec | +22 | 325 sec | +35 | 168 sec | +45 |
| 0 Voltage | 305 sec | | 360 sec | | 213 sec | |
| Voltage drop time from start to 0 Voltage | 119 sec | | 235 sec | | 111 sec | |

Referring to Table 1, REFERENCE is a case in which the venting part 900 is not formed in the battery module, CASE 1 is a case where the venting part 900 is formed so as to be adjacent to the LV member as in the embodiment of the present disclosure, CASE 2 is a case where the venting part 900 is formed entirely on the upper plate of the module frame 200.

In the case of REFERENCE, the initial venting and flame generation time was 156 sec, and venting and flame were found slightly later than CASE 1 and CASE 2. However, on and after 186 sec, the voltage drop progressed rapidly, and the total time required for voltage drop was found to be 119 sec. This may be because the battery module of REFERENCE has a sealed structure in which the venting part 900 is not formed and thus, the oxygen supply is blocked during internal ignition, and the initial venting and flame generation times are delayed. In addition, after venting and flames are generated, ignition is promoted in accordance with the inflow of external oxygen, and the voltage drop can progress rapidly.

In case of CASE 2, the initial venting and flame generation times was 74 sec, and venting and flame were found earlier than the time point in other cases. The voltage drop started from 102 sec, and the total time required for voltage drop was found to be 111 sec until 213 sec when the voltage became 0. In case of CASE 2, it was found that the initial voltage drop proceeded very quickly than in other cases. This may be because sufficient oxygen is supplied through the plurality of venting units 900, so that heat propagation is rapidly spread.

In case of CASE 1, the initial venting and flame generation time was 88 sec, and the voltage drop progressed from 125 sec to 360 sec, and the total time for required for voltage drop was found to be 235 sec. CASE 1 showed a longer total voltage drop time compared to other cases, and the time required for step-by-step voltage drop was also found to be even and long as compared with other cases. This may be because heat propagation can be delayed by properly discharging heat and gas inside the battery module while excess oxygen is not flown in through the venting part 900 as compared with CASE 1. In addition, the venting part 900 of CASE 2 is located adjacent to the LV member and the flow of the gas lamp is induced in the direction in which the LV member is located, it relieves the temperature around the HV member, which may be in a relatively high temperature state.

On the other hand, in the description of Table 1, the reference numerals shown in FIG. 7 were added to the venting part, and this is only for convenience of description, and the same effect as the above-described description may be exhibited even in FIGS. 8, 9 or other venting parts.

The battery pack according to another embodiment of the present disclosure may include the above-mentioned battery module, an adjacent battery module adjacent to the battery module, and a pack case for housing the battery module and the adjacent battery module. A first terminal busbar and a second terminal busbar included in each of the battery module and the adjacent battery module may be disposed in a direction facing each other. At this time, a first venting part formed in the battery module and a second venting part formed in the adjacent battery module may each have a hole structure in which they are vented away from each other.

The above-mentioned battery module and the battery pack including the same according to the present embodiment can be applied to various devices. Such a device can be applied to a vehicle means such as an electric bicycle, an electric vehicle, or a hybrid vehicle, but the present disclosure is not limited thereto, and is applicable to various devices that can use a secondary battery.

Although the invention has been shown and described above with reference to the preferred embodiments, the scope of the present disclosure is not limited thereto, and numerous other modifications and embodiments can be devised by those skilled in the art, which will fall within the spirit and scope of the principles of the invention described in the appended claims.

DESCRIPTION OF REFERENCE NUMERALS

200: module frame
310, 320: busbar frame
410, 420: end plate
520: terminal busbar
600: module connector
900, 910, 920: venting part

The invention claimed is:

1. A battery module comprising:

a battery cell stack in which a plurality of battery cells are stacked;

a module frame that houses the battery cell stack, the module frame having an upper plate having a first side and a second side;

a first busbar frame that is housed in the module frame and covers a front surface of the battery cell stack; and a second busbar frame that is housed in the module frame and covers a rear surface of the battery cell stack, wherein a terminal busbar is mounted to the first busbar frame, and a module connector is mounted to the second busbar frame, and wherein the module frame is formed with a vent penetrating the upper plate, and all of the vent is located closer to the module connector than the terminal busbar and spaced from the second side of the module frame.

2. The battery module of claim 1, wherein the vent has a hole structure formed in the upper plate, and the hole structure penetrates the upper plate obliquely so that an upper end is closer to the second busbar frame.

3. The battery module of claim 1, wherein the terminal busbar is connected to an external busbar that provides a connection with another battery module.

4. The battery module of claim 1, wherein the vent is formed so as to vent a gas in a direction toward the second busbar frame is located.

5. The battery module of claim 1, wherein the vent comprises:

an inflow port that is formed in the upper plate of the module frame and faces the battery cell stack; and a discharge port that discharges gas flowed in through the inflow port, and wherein the discharge port is formed in a direction perpendicular to the inflow port.

6. The battery module of claim 5, wherein the vent comprises:

a connection part that is formed between the inflow port and the discharge port and guides gas flowing into the inflow port toward the discharge port, and wherein an upper surface of the connection part is formed obliquely to the upper plate.

7. The battery module of claim 1, wherein the vent is formed so as to be vented in an upward direction with respect to the battery cell stack.

8. The battery module of claim 7, wherein the vent comprises:

an inflow port that is connected to the battery cell stack and is formed in the upward direction on the upper plate of the module frame;

a discharge port that is formed in the upward direction and discharges the gas flown in through the inflow port; and a connection part that connects the inflow port and the discharge port, and wherein the connection part is formed in a direction perpendicular to inflow and discharge directions of the inflow port and the discharge port.

9. The battery module of claim 1, wherein a discharge passage is formed between the upper plate of the module frame and the battery cell stack.

10. A battery pack comprising the battery module of claim 1.

* * * * *